United States Patent
Abe

[19]

[11] Patent Number: 6,015,606

[45] Date of Patent: Jan. 18, 2000

[54] ADHESIVE-COATED FILM

[75] Inventor: Hidetoshi Abe, Tendo, Japan

[73] Assignee: 3M Innovative Properties Company, St. Paul, Minn.

[21] Appl. No.: 08/817,323

[22] PCT Filed: Sep. 15, 1995

[86] PCT No.: PCT/US95/11767

§ 371 Date: Apr. 7, 1997

§ 102(e) Date: Apr. 7, 1997

[87] PCT Pub. No.: WO96/11116

PCT Pub. Date: Apr. 18, 1996

[30] Foreign Application Priority Data

Oct. 6, 1994 [JP] Japan .................................. 6-243079

[51] Int. Cl.[7] .......................................................... C09J 7/02
[52] U.S. Cl. ........................... 428/214; 428/343; 428/354
[58] Field of Search ................................... 428/343, 354, 428/355 AC, 214

[56] References Cited

U.S. PATENT DOCUMENTS

| | | |
|---|---|---|
| 4,735,837 | 4/1988 | Miyasaka . |
| 4,855,170 | 8/1989 | Darvell . |
| 4,994,322 | 2/1991 | Delgado . |

FOREIGN PATENT DOCUMENTS

94/22971  10/1994  WIPO .

*Primary Examiner*—Jenna Davis
*Attorney, Agent, or Firm*—Dale A. Bjorkman

[57] ABSTRACT

An adhesive film for decoration prepared by coating an adhesive on a surface of a film substrate, characterized in that the adhesive has microspheres, an elastic modulus of the to 1 microspheres is $1 \times 10^4$ to $1 \times 10^7$ dyn/cm$^2$ and their particle diameter is 10 to 100 $\mu$m (volume average diameter).

5 Claims, 1 Drawing Sheet

ADHESIVE-COATED FILM

TECHNICAL FIELD

This invention relates to an adhesive film and more particularly to film coated with a microsphere adhesive that easily permits trapped air bubbles to escape.

BACKGROUND OF THE INVENTION

When an adhesive film for decoration according to the prior art is bonded to a substrate article, air is entrapped between the adhesive and the substrate article, and to prevent entrapment, a considerably high level of skill is necessary. Further, a great deal of labor and time are necessary for the bonding work. When the conventional adhesive film for decoration is bonded to the substrate article and is used indoors and outdoors, the bonding strength rises with the passage of time, and it is extremely difficult to peel the adhesive film from the substrate article. Thus, a great deal of labor and time are also necessary.

An adhesive sheet material disclosed in Japanese Examined Patent Publication (Kokoku) No. 44-17040 and a positionable adhesive tape disclosed in Japanese Unexamined Patent Publication (Kokai) No. 3-181578 form recesses in a support or a carrier web, and dispose non-adhesive members or glass beads in the recesses. Because the adhesive does not directly come into contact with the substrate article, these tape and web have slidability and working becomes easier. However, the process step of forming the recesses in the support and the carrier web is necessary. After the film is pressed on the substrate article, the adhesive does not have protuberances any more, and the substrate article and the adhesive do not have point contact any more, either. Accordingly, when air remains on the substrate article at the center of the film, this air cannot be removed. Since surface contact is established when the film is press-bonded to the substrate article, the contact area increases with time and the bonding strength increases, so that re-peel is extremely difficult.

A pressure-sensitive adhesive composition disclosed in Japanese Examined Patent Publication (Kokoku) No. 45-17074 is obtained by mixing light-weight brittle glass beads having a thin wall with a liquid adhesive composition and coating and drying the mixture. The adhesive having protuberances obtained in this way has slidability because the adhesive does not come into direct contact with the substrate article, and working becomes easy. However, after the film is press-bonded on the substrate article, the glass beads are ruptured, and the substrate article and the adhesive do not have the point contact any more. Accordingly, if air remains at the center of the film, this air cannot be removed. Further, when the film is press-bonded to the substrate article, the contact area becomes greater with time and the bonding strength increases, so that re-peel is extremely difficult.

An adhesive tape for packaging disclosed in Japanese Unexamined Utility Model Publication (Kokai) No. 59-763 and an adhesive tape disclosed in Japanese Unexamined Utility Model Publication (Kokai) No. 59-37343 prevent entrapment of air by partial disposition of an adhesive layer. However, these tapes involve the problem in that because the adhesive must be scattered in a dot system or a stripe pattern, a specific coating machine for this purpose is necessary. Another problem is that the film surface gets uneven due to the dots or the stripe pattern which is partially disposed.

An air-permeable adhesive member disclosed in Japanese Unexamined Patent Publication (Kokai) No. 2-45582 has a structure wherein an air-permeable adhesive layer containing hollow beads is disposed on a porous air-permeable substrate, and a large number of microspheres communicating with the pores in the substrate are disposed. According to this conventional art, the substrate is limited because it must be porous, and special equipment is necessary for partially removing an adhesive solution by a gas blow system or an air suction system from the air-permeable substrate side after the coating solution is applied. Another problem is that when an ink for decoration is applied, it closes the pores of the air-permeable substrate and initial performance cannot be obtained.

An outdoor adhesive sheet disclosed in Japanese Unexamined Utility Model Publication (Kokai) No. 59-54547 has a structure wherein a flat film is laminated on one of the surfaces of a film having a continuous foam layer formed thereon, and an adhesive layer is disposed on the other surface so that the gas generated from the substrate with time is allowed to permeate. However, this sheet is not free from the problem that air entrapped at the time of bonding cannot be removed because the adhesive layer is not air-permeable.

A re-peelable protective sheet disclosed in Japanese Unexamined Utility Model Publication (Kokai) No. 5-56938 has a structure wherein microspheric adhesive components are deposited with intervals between them on one of the surfaces of a support. This sheet involves the problem that the bonding strength to the bonded article is as low as 100 gf/25 and when it is used outdoors, it naturally peels.

A re-peelable adhesive sheet disclosed in Japanese Unexamined Utility Model Publication (Kokai) No. 61-168146 has a structure wherein an adhesive composition layer comprising elastic microspheres and an adhesive is formed on a substrate. A desired adhesive composition preparation solution is obtained by dispersing the microspheres and the adhesive in a volatile organic solvent. However, the elastic microspheres are obtained by a suspension polymerization method using water as a medium and in order to uniformly disperse them in the organic solvent, the water content must be removed. However, this process step has an extremely low level of productivity and another problem lies in that the elastic microspheres undergo deformation and degradation due to the influences of the organic solvent, and desired point contact cannot be obtained after the sheet is bonded to the bonded article. Still another problem is that the bonding strength cannot be controlled when the adhesive composition is applied to the entire surface of the substrate, and the adhesive must be coated in a pattern such as a square or a circle, so that a specific coating machine for this purpose is necessary.

A positionable adhesive having a high shearing force, which is disclosed in WO92/13924, has a structure wherein an adhesive composition layer comprising elastic microspheres and an adhesive is formed on a substrate. Since a mixing ratio of the elastic microspheres to the adhesive is high, the elastic microspheres are packed in a high density to the adhesive layer, and since air passages necessary for deforming are not formed, air bubbles entrapped between the adhesive and the substrate article cannot be removed. Because such an adhesive film has a flat adhesive layer, bonding between the adhesive and the substrate article becomes bonding by surface contact, and because the bonding strength rises with the passage of time, re-peel is difficult.

SUMMARY OF THE INVENTION

The present invention provides an adhesive film that is free from the problems described in the art, can be produced extremely easily, can easily remove air entrapped between the adhesive layer and the substrate article at the time of bonding, and can be peeled from the bonded article.

In particular, to solve the problems described in the art, the present invention provides an adhesive film for decoration that is produced by applying an adhesive on a surface of a film substrate, the present invention provides an adhesive film that is characterized in that the adhesive has microspheres, wherein an elastic modulus of the microspheres is in the range of $1 \times 10^4$ to $1 \times 10^7$ dyn/cm$^2$, and an average particle size is in the range of 10 to 100 $\mu$m (in terms of volume average diameter).

DESCRIPTION OF THE PREFERRED EMBODIMENT(S)

The thickness of the film substrate used in the adhesive film of the present invention is not particularly limited, but is preferably from 10 $\mu$m to 1,500 $\mu$m from the aspect of easy availability. The film substrate preferably has an elastic modulus of $1 \times 10^9$ to $1 \times 10^{12}$ dyn/cm$^2$. When this elastic modulus is less than $1 \times 10^9$ dyn/cm$^2$, the film is so soft and flexible that irregularity is likely to occur on the film surface and the problem of appearance develops. When the elastic modulus is greater than $10^{12}$ dyn/cm$^2$, the film is so hard that it cannot be easily deformed and its property to follow a curved surface is very low.

Figure 1A:
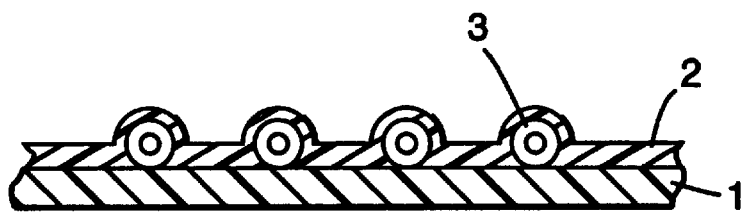
FIG. 1 is a schematic view of the section of a film according to the present invention.
Figure 1B:
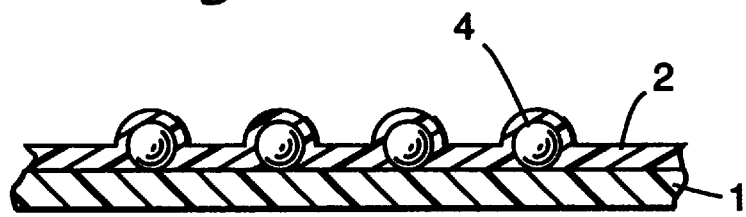

Referring generally to the drawing and in particular to the figures, FIG. 1 is a schematic view showing the section of the film according to the present invention. In the drawing, symbol (A) represents the case where hollow spheres are used as the elastic microspheres, and (B) represents the case where solid spheres are used. In these drawings, reference numerals 1, 2 and 3 denote a film substrate, an adhesive and hollow spheres, respectively, and reference numeral 4 denotes solid spheres.

The adhesive film satisfying the conditions described above can easily permit escape air entrapped between the film and the substrate at the time of bonding, and because the film and the substrate are out of surface contact, re-peel is easy, and the adhesive of the film does not remain on the substrate surface at the time of peel.

Figure 2A:
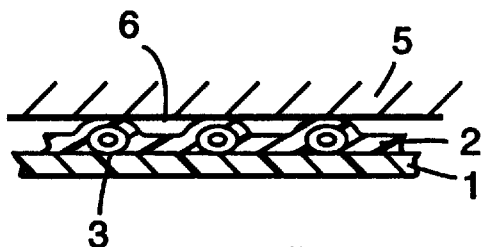
FIG. 2 is a schematic view showing the section under a state where the film according to the present invention is bonded to a bonded article.
Figure 2B:
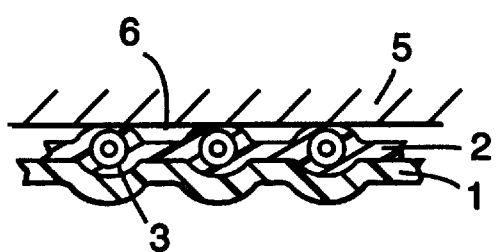
Figure 2C:
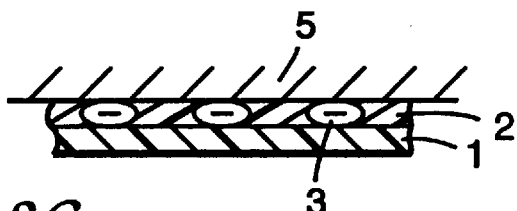

FIG. 2 shows the effect of the present invention described above, and is a FIG. 2 sectional view of the film after it is bonded to a substrate article. In the drawing, (A) represents the case where the elastic modulus of the microspheres is $1 \times 10^4$ to $1 \times 10^7$ dyn/cm$^2$ and falls within the range of the present invention. In this case, gaps (6) are defined between the adhesive layer (2) and the substrate article (5), and entrapment of air at the time of bonding can be prevented. Moreover, because the microspheres have suitable elasticity, the microspheres become appropriately flat, and the surface of the film substrate becomes flat. FIG. 2(B) represents the case where the elastic modulus of the microspheres is greater than $1 \times 10^7$ dyn/cm$^2$. In this case, the gaps (6) are defined between the adhesive layer (2) and the substrate article (5), and entrapment of air at the time of bonding can be prevented. However, because the microspheres do not undergo deformation, irregularity occurs on the surface of the substrate sheet. FIG. 2(C) represents the case where the elastic modulus of the microspheres is less than $1 \times 10^4$ dyn/cm$^2$. Because the microspheres become extremely flat and gaps are not formed between the adhesive layer and the substrate article, entrapment of air at the time of bonding cannot be prevented.

Examples of the material of the film substrate include a polyvinyl chloride resin, a polyester resin, a polyacrylic resin, a Teflon resin, a polyolefin resin, and so forth. Concrete examples are polyvinyl chloride, polyethylene terephthalate, polycarbonate, polyvinylidene fluoride, polyethylene, polypropylene, polymethacrylate, Teflon, and so forth.

Particularly, the polyvinyl chloride resin can be easily printed to the surface and is suitable as the film substrate. It is economical and has suitable weatherability, so that it can be used outdoors, too. It is possible in the present invention to use those film substrates to which surface treatment such as embossing or protection or mold release treatment is applied on the back.

Next, the elastic microspheres used in the present invention will be explained. When the adhesive film is press-bonded by a squeezer, etc., the pressure applied to the film is about 15 kg/cm$^2$ and the elastic microspheres used in the present invention have a strength such that they are not ruptured by such a pressure. An acrylic resin, a silicone resin, a urethane resin, a vinyl acetate resin, a Teflon resin, a polyamide resin, a vinyl chloride resin, a styrene resin, a phenolic resin, an epoxy resin, a styrene-butadiene-styrene block copolymer resin, a styrene-ethylene-butyelene-styrene block copolymer resin, a styrene-isoprene-styrene block copolymer resin, NBR, chloroprene rubber, natural rubber, etc. can be used as the material of the elastic microspheres.

Particularly preferred among them is the acrylic resin because it has excellent weatherability, is suitable as a decoration material for outdoor use, and can easily and economically provide the elastic microspheres by a suspension polymerization method, or the like. Moreover, Tg and the elastic modulus can be easily controlled because the kinds of monomers and cross-linking agents are versatile, and a suitable bonding strength can be obtained at room temperature while the shapes of the microspheres are retained. Further, there is the advantage that even when the elastic microspheres are added to the adhesive, the drop of the bonding strength is small.

The acrylic resin is used in most cases for the principal agent of the adhesive because it is generally economical and has a high bonding strength. Another advantage is that when the acrylic type elastic microspheres are used for such an adhesive, the specific gravity is uniform and dispersion is extremely easy. Since the elastic microspheres can easily undergo elastic deformation, the microspheres may be of a hollow type or may have voids consisting of these resins.

Examples of the acrylic resins suitable for forming the elastic microspheres are copolymers between an acrylate and acrylic acid such as listed below:

2-ethylhexyl acrylate/acrylic acid (99/1–90/10) copolymer (Tg=–69 to –60° C.)

n-butyl acrylate/acrylic acid (99/1–90/10) copolymer (Tg=–54 to –45° C.)

isononyl acrylate/acrylic acid (99/1–90/10) copolymer (Tg=–81 to –72° C.)

ethyl acrylate/acrylic acid (99/1–90/10) copolymer (Tg=–21 to –13° C.)

Further, isooctyl acrylate, isobutyl acrylate, 2-methylbutyl acrylate, etc. can be used as the acrylic ester monomer constituting the acrylic resin, and other alpha-olefincarboxylic acids such as methacrylic acid can be used in place of acrylic acid. When these monomers are used, too, the weight ratio between the acrylate and alpha-olefincarboxylic acid is preferably within the range of 99/1 to 90/10.

Cross-linking can be carried out by using a bifunctional acrylate such as 1,4-butyl-2 diacrylate, divinyl benzene, etc., as a monomer component, for example. When these cross-linking agents are added, a rigidity ratio generally becomes great and tack decreases. Accordingly, in order to provide a suitable bonding strength, the amount of the cross-linking agent is not greater than 0.5 parts by weight, preferably not greater than 0.1 parts by weight, on the basis of 100 parts by weight of the monomer.

In the acrylic resin and other resins, the material of the elastic microspheres may be of a cross-linkage type resin or non-cross-linkage type resin. In the case of the cross-linkage type resin, cross-linkage may be cross-linkage by a covalent bond or physical cross-linkage. In the case of the cross-linkage type, a wide range of organic solvents can be used as a solvent of a coalescing solution of the adhesive, and they are preferred because drying is easy. A styrene-butadiene-styrene block copolymer resin and an ionomer resin are preferred because they are not dissolved in the solvent but keep the predetermined shapes of microspheres and provide suitable flexibility when a suitable kind of solvent is selected. Further, even in the case of the non-cross-linkage type, suitable flexibility can be obtained while retaining the predetermined shapes of microspheres and the problem of toxicity of organic solvents can be eliminated.

Tg of the material of the elastic microspheres is preferably lower than the room temperature. This is because a suitable bonding strength can be obtained at the room temperature, and a high bonding strength of the adhesive film as the adhesive as a whole can be obtained.

Here, the production method of the elastic microspheres is not particularly limited, and the microspheres can be obtained by suspension polymerization, emulsion polymerization or seed polymerization.

The volume average diameter of the elastic microspheres used in the present invention is from 10 $\mu$m to 100 $\mu$m. When the diameter is smaller than 10 $\mu$m, the film does not naturally peel, and both performance of the bonding strength and removal of bubbles cannot be simultaneously satisfied. When the diameter is greater than 100 $\mu$m, irregularity occurs on the surface of the substrate film and an ink layer cannot be uniformly printed. Because the density of ink cannot be controlled, the film cannot be used as a film for decoration.

The compression elastic modulus of the microspheres used in the present invention is from $\times 10^4$ to $1 \times 10^7$ dyn/cm$^2$ at 20° C. When the adhesive film is bonded by a squeezer, etc., the pressure applied to the film is about 15 kg/cm$^2$, and because the elastic microspheres used in the present invention have a strength such that they are not ruptured by such a pressure, the protuberances can be retained after bonding of the film and consequently, because passages of bubbles can be secured. When the compression elastic modulus is smaller than $1 \times 10^4$ dyn/cm$^2$, aggregation of the microspheres is not sufficient. Consequently, the microspheres cannot be easily retain the spherical shape, and undergo deformation due to bonding, and the escape passages of bubbles cannot be sufficiently secured. When the compression elastic modulus is greater than $1 \times 10^7$ dyn/cm$^2$, adhesiveness drops and the film cannot be used.

The volume average diameter of the elastic microspheres are determined in accordance with the following equations by measuring 1,000 microspheres by using an image processor by using an optical microscopic method:

$$\text{volume average diameter} = \Sigma ni \cdot di^4 / \Sigma ni \cdot di^3$$

where n is the number of the microspheres, d is a diameter of microspheres measured ($\mu$m), and i is an index.

In the present invention, the compression elastic modulus of the elastic microspheres is measured by using a viscoelastic spectrometer ("RSA11", a product of Rheometric Co.).

In the present invention, the elastic microspheres may be singly dispersed in the adhesive, or two or more microspheres may form a cluster in aggregation. It is because when the microspheres take the cluster structure, the escape of the entrapped air becomes better. Such a cluster can be formed by adding in advance the microspheres to the adhesive solution through a binder such as gelatin, gum arabic, alcohol, etc., and then coating the solution. The cluster can be formed, too, by utilizing the reaggregation effect at the time of drying in coating by selecting a suitable drying condition.

The size of the cluster is preferably 2 to 100 pieces in terms of the number of the microspheres. When the number of the microspheres is greater than 100, variance of the bonding strength becomes great or an area in which the microspheres do not exist become great, so that escape performance of the entrapped air becomes low, on the contrary.

Further, the elastic microspheres may be of the hollow type or the non-hollow type, or may have a large number of voids inside the surface or the particles.

These particles can be formed by changing the aforementioned production condition and the kinds of the monomers, and more concretely, they can be produced by the method described in Japanese Unexamined Patent Publication (Kokai) No. 2-194079.

Next, the adhesive used in the present invention will be further explained.

The adhesive used in the present invention is not particularly limited, and known adhesives such as an acrylic resin, a rubber type resin (natural rubber type resin and synthetic rubber type resin), a silicone type resin, a vinyl acetate type resin, etc., can be used.

The mixing ratio of the elastic microspheres and the adhesive in the present invention is from 30:100 to 900:100 and preferably, from 100:100 to 900:100, in terms of a solid content ratio. Then the ratio of the elastic microspheres becomes small, the distribution of the microspheres becomes coarse, the adhesive surface becomes substantially flat, and the escape passages of the bubbles cannot be sufficiently secured, so that bubble removing performance remarkably drops. When the proportion of the elastic microspheres is much greater, the microspheres are packed and distributed, so that escape performance of bubbles gets deteriorated.

The coating weight of the mixture comprising the adhesive and the elastic microspheres is 4 to 40 g/m$^2$. When the coating weight is smaller than 4 g/m$^2$ it becomes difficult to reliably bond the adhesive film to the substrate article, and the film is likely to naturally peel. When the coating weight is greater than 40 g/m$^2$ bubble removing performance is lost and at the same time, the bonding strength to the substrate article becomes high, so that re-peel becomes extremely difficult.

The thickness of the adhesive is preferably 20 to 90% of the volume average diameter of the elastic microspheres. When the thickness is less than 20%, the adhesive cannot be reliably bonded to the bonded article and when the thickness is greater than 90%, on the other hand, bubble removing performance drops.

In the production of the adhesive film according to the present invention, the adhesive and the elastic microspheres are mixed in a predetermined proportion, and the mixture solution is coated to the substrate sheet and is dried in a customary manner. Coating is carried out by using a knife coater, a gravure coater, a roll coater, and so forth. Drying after coating is carried out at 80 to 100° C. for 3 to 10 minutes.

The most suitable bonding strength of the adhesive film in the present invention is 200 to 1,000 gf/25 mm and is most preferably 350 to 450 gf/25 mm.

In the adhesive film of the present invention satisfying the conditions described above, the adhesive layer exists on the surface of the film substrate, and a large number of elastic microspheres are dispersed in the adhesive layer. Accordingly, the surface of the adhesive layer is not flat and a large number of protuberances due to the microspheres are formed. Accordingly, when the adhesive film is put on the surface of the bonded article, the bonded surface and the adhesive layer surface do not come into close contact throughout the entire surfaces, but a large number of air passages are formed. Accordingly, air entrapped between the adhesive film and the bonded surface when the adhesive film is bonded to the bonded surface by the squeezer, etc., can be easily removed through these air passages, and the bonding work of the adhesive film becomes extremely easy.

The elastic microspheres are caused to deform to the right and left by the pressure applied from the squeezer, form the air flow and effectively push out entrapped air to the outside. In the adhesive film of the present invention, since the elastic microspheres are suitably deformable, the relationship between the coating thickness of the adhesive and the diameter of the microspheres need not be strictly controlled. As a result, the production condition becomes mild, and advantages from the aspect of production become great.

Further, because the adhesive layer is in point contact with the bonded article through the elastic microspheres having high aggregation property, the contact area does not become great with the passage of time, but the bending strength at the time of bonding can be stably maintained. Accordingly, the film has excellent re-peelability.

EXAMPLES

Predetermined amounts of the elastic microspheres and the adhesive were mixed and sufficiently stirred. The mixture was coated in such a manner as to attain a predetermined coating weight after drying, and was dried at 100° C. for 5 minutes. Thereafter, a release liner (separator) was laminated.

Test Methods
Escapability of Bubbles

After the separator was peeled, a 10×10 cm sample was placed on a flat and smooth acrylic plate, and was squeezed by a squeezer towards the center of the adhesive film so that bubbles could be gathered. A roller of 2 kg was rolled on the air bubbles thus formed, and the mode of escape of the air bubbles was observed. This procedure was repeated four times. The sample where the air bubbles were completely pushed out was indicated by mark o and the sample where the air bubbles remained partially was indicated by mark x.

Smoothness of Film Surface

A sample of 30 cm × 30 cm was applied to a flat and smooth acrylic plate, and any irregularity of the film surface was inspected with eye. The sample wherein the shapes of the elastic microspheres were recognized was indicated by mark x and the sample wherein the shapes were not recognized was evaluated by mark o.

Adhesion

A sample was cut into 15 cm × 2.5 cm and was bonded to an aluminum plate subjected to degreasing treatment by IPA under the condition of 20° C. × 65% RH by using a roller as described in JIS Z0237. After the sample was left standing under the same condition for 48 hours, a 90° peel strength at an angle of 90° was measured at a peel rate of 30 cm/min using a Tensilon.

Natural Peel-off

A sample was bonded to an aluminum plate, was placed into a heat cycle tester and was aged for seven cycles. Thereafter, any peel from the substrate was examined. The sample without peel was indicated by mark o and the sample with peel was indicated by mark x.

Heat cycle: 1 cycle (24 hours)
−30° C. × 0% RH (2 hrs) − (1 hr) − 23° C. × 65%RH (0.5 hr) −
(0.5 hr) − 40° C. × 95% RH (2 hrs) − (0.5 hr) −
23° C. × 65% RH (0.5 hr) − 30° C. × 0% RH (2 hrs) − (1 hr) −
23° C. × 65% RH (0.5 hr) − (1 hr) − 80° C. × 50% RH (11 hrs) −
(1 hr) − 23° C. × 65% RH (0.5 hr)

Example 1

Microspheres

Microspheres having various mean particle diameters, which were obtained by suspension-polymerizing isooctyl acrylate and acrylic acid in a proportion of 94/6 as the monomers, using water as a medium, were used. The compression elastic modulus of the elastic microspheres was $2.3 \times 10^6$ dyn/cm$^2$.

Adhesive

AE 238B, a product of Nippon Gosei Gomu K.K.

Film Substrate

A polyvinyl chloride film having a thickness of 100 μm and an elastic modulus of $2 \times 10^{10}$ dyn/cm$^2$ was used, Evaluation Test Film Size The production condition and the characteristics of the adhesive film produced were as follows:

| | |
|---|---|
| Bubble escapability test: | 10 cm × 10 cm |
| Film surface smoothness test: | 30 cm × 30 cm |
| Adhesion test: | 15 cm × 2.5 cm |

Conditions for preparation and properties of adhesive film are as follows.

TABLE 1

| Experiment No. | Volume average diameter of elastic microsphere (μm) | Weight ratio of elastic microsphere and adhesive | Coating weight (g/m²) | Bubble escapability | Smoothness of film surface | Example/Comparative Example |
|---|---|---|---|---|---|---|
| 1-1 | 168 | 29/71 | 80.7 | x | x | Comp. Ex. |
| 1-2 | 115 | 17/83 | 54.0 | o | x | Comp. Ex. |
| 1-3 | 50 | 20/80 | 18.0 | x | o | Comp. Ex. |
| 1-4 | 50 | 90/10 | 20.3 | o | o | Example |
| 1-5 | 50 | 80/20 | 21.0 | o | o | Example |
| 1-6 | 50 | 54/46 | 25.0 | o | o | Example |

| Experiment No. | Volume average diameter of elastic microsphere (μm) | Weight ratio of elastic microsphere and adhesive | Coating weight (g/m²) | Adhesion (gf/25 mm) | Peeling | Example/Comparative Example |
|---|---|---|---|---|---|---|
| 1-7 | 50 | 80/20 | 3.0 | 50 | x | Comp. Ex. |
| 1-8 | 50 | 44/56 | 56.2 | 1150 | o | Comp. Ex. |
| 1-9 | 50 | 90/10 | 16.0 | 430 | o | Example |
| 1-10 | 50 | 80/20 | 14.5 | 380 | o | Example |

In Experiment 1—1 (Comparative Example), bubbles did not escape because the coating weight was too large, but in Experiments 1-4 to 1-6 (Examples), bubble escape performance was excellent because the coating weight was suitable. In Experiments 1— 1 and 1-2 (Comparative Examples), irregularity occurred on the film surface because the diameter of the elastic microspheres was too large, but in Experiments 1-4 to 1-6 (Examples), the film had excellent appearance. In Experiment 1-3 (Comparative Example), bubble escape performance could not be obtained because the weight ratio of the elastic microspheres and the adhesive was not suitable, but in Experiments 1-4 to 1-6 (Examples), the films had excellent bubble escape performance.

In Experiment 1-7 (Comparative Example), the coating weight was so low that the film naturally peeled from the substrate article, but Experiments 1-9 and 1-10 (Examples) had excellent adhesion characteristics. In Experiment 1-8 (Comparative Example), the bonding strength was so high that re-peel from the bonded article was extremely difficult, but Experiments 1-19 and 1-10 had excellent re-peelability.

Example 2
Elastic Microspheres

The same composition as the one described in Example 1 was used.

Adhesive

The same adhesive as in Example 1 was used.

Film Substrate

A substrate was made of polyvinyl chloride and had an elastic modulus of $2 \times 10^{10}$ to dyn/cm and a thickness of 100 μm.

Evaluation Film Size:

| Irregularity of film surface | 30 cm × 30 cm |
|---|---|
| Test for air bubble escaping | 10 cm × 10 cm |
| Test for adhesion | 15 cm × 2.5 cm |

TABLE 2

| Experiment No. | Elastic microsphere | Elastic modulus dyn/cm² | Particle diameter μm | Elastic microsphere Parts by weight | Coating weight (g/m²) | Coating thickness of adhesive (%) | Smoothness of film surface | Bubble escapability | Adhesion (gf/25 mm) | Example/Comparative Example |
|---|---|---|---|---|---|---|---|---|---|---|
| 2-1 | Elastic | $1 \times 10^6$ | 50 | 500 | 20 | 50 | o | o | 410 | Example |
| 2-2 | micro- | $1 \times 10^3$ | 50 | 500 | 20 | 50 | o | x | 610 | Comp. Ex. |
| 2-3 | sphere | $1 \times 10^{10}$ | 50 | 500 | 20 | 50 | x | o | 80 | Comp. Ex. |
| 2-4 | (solid | $1 \times 10^6$ | 5 | 500 | 20 | 50 | o | x | 820 | Comp. Ex. |
| 2-5 | type) | $1 \times 10^6$ | 150 | 500 | 20 | 50 | x | o | 120 | Comp. Ex. |
| 2-6 |  | $1 \times 10^6$ | 50 | 10 | 20 | 50 | o | x | 230 | Comp. Ex. |
| 2-7 |  | $1 \times 10^6$ | 50 | 1500 | 20 | 50 | o | x | 170 | Comp. Ex. |
| 2-8 |  | $1 \times 10^6$ | 50 | 500 | 2 | 10 | o | o | 40 | Comp. Ex. |
| 2-9 |  | $1 \times 10^6$ | 50 | 500 | 50 | 100 | o | x | 1200 | Comp. Ex. |
| 2-10 | Elastic | $1 \times 10^6$ | 50 | 500 | 20 | 50 | o | o | 400 | Example |
| 2-11 | micro- | $1 \times 10^3$ | 50 | 500 | 20 | 50 | o | x | 680 |  |
| 2-12 | sphere | $1 \times 10^{10}$ | 50 | 500 | 20 | 50 | x | o | 180 |  |
| 2-13 | (hollow | $1 \times 10^6$ | 5 | 500 | 20 | 50 | o | x | 800 | Comp. Ex. |
| 2-14 | type) | $1 \times 10^6$ | 150 | 500 | 20 | 50 | x | o | 230 | Comp. Ex. |
| 2-15 |  | $1 \times 10^6$ | 50 | 10 | 20 | 50 | o | x | 420 | Comp. Ex. |
| 2-16 |  | $1 \times 10^6$ | 50 | 1500 | 20 | 50 | o | x | 350 | Comp. Ex. |
| 2-17 |  | $1 \times 10^6$ | 50 | 500 | 2 | 10 | o | o | 50 | Comp. Ex. |
| 2-18 |  | $1 \times 10^6$ | 50 | 500 | 50 | 100 | o | x | 1250 | Comp. Ex. |
| 2-19 | Glass | — | 70 | 20 | 20 | 50 | x | x | 50 | Comp. Ex. |

TABLE 2-continued

| | Elastic microsphere | | | Coating | | | | | |
|---|---|---|---|---|---|---|---|---|---|
| Experiment No. | Elastic modulus dyn/cm$^2$ | Particle diameter μm | Elastic microsphere Parts by weight | Coating weight (g/m$^2$) | thickness of adhesive (%) | Smoothness of film surface | Bubble escapability | Adhesion (gf/25 mm) | Example/ Comparative Example |
| 2-20 | beads Nil | — | — | — | 15 | 100 | o | x | 900 | Comp. Ex. |

In Table 2, the term "parts by weight of the elastic microspheres" is the value on the basis of 100 parts by weight of the adhesive, and the term, "coating weight" is a value representing the thickness of the adhesive layer coated with respect to the volume average diameter of the elastic microspheres.

The production condition of the adhesive film and the characteristics of the film so produced were as follows.

Since Experiments 2-1 and 2-10 were within the suitable range of condition, excellent film surface flatness, bubble escapability and adhesion could be obtained. In Experiments 2-2 and 2-12, the elastic modulus of the elastic microspheres was so low that the bubbles could not escape. In Experiments 2-3 and 2-11, the elastic modulus of the elastic microspheres was so high that irregularity occurred on the surface of the film.

In Experiments 2-4 and 2-13, the particle size of the elastic microspheres was so small that the bubbles could not escape, and in Experiments 2-5 and 2-14, on the other hand, the particle size was so large that irregularity occurred on the film surface.

In Experiments 2-6 and 2-15, the proportion of the adhesive to the elastic microspheres was too large and in Experiments 2-7 and 2-16, it was too small, so that bubble escapability could not be obtained in either case. In Experiments 2-8 and 2-17, the coating weight was so small that adhesion was too low, and in Experiments 2-9 and 2-18, the coating weight was so large that adhesion became too high. In Experiment 2-19, since the glass beads did not easily undergo deformation, irregularity was likely to occur, and because the adhesive and the bonded article had the point contact, adhesion was low. In Experiment 2-20, bubble escapability was low because the adhesive and the bonded article came into the surface contact.

Example 3

Elastic Microspheres

Microspheres having an elastic modulus of 3×10$^6$ dyn/cm$^2$ and a mean particle diameter of 50 μm and made of isooctyl acrylate/acrylic acid in a ratio of 95/5 were used.

Adhesive 100 parts by weight of the adhesive described in Example 1 was used for 500 parts by weight of the elastic microspheres.

Film Substrate

A film made of polyester was used.

Coating Weight 20 g/m$^2$ per film substrate

Film size for evaluation test:

| Irregularity of film surface | 30 cm × 30 cm |
|---|---|
| Test for air bubble escaping | 10 cm × 10 cm |
| Test for adhesion | 15 cm × 2.5 cm |

The production condition and the characteristics of the adhesive film so produced were tabulated in the following Table 3.

| Experiment No. | Film Thickness | Film Elastic modulus | Smoothness of film surface | Bubble escapability | Adhesion gf/25 mm | Example/ Comparative Example |
|---|---|---|---|---|---|---|
| 3-1 | 100 μm | 5 10$^6$ dyn/cm$^2$ | o | o | 380 | Example |
| 3-2 | 100 | 2 × 10$^8$ | x | x | 360 | Comp. Ex. |
| 3-3 | 100 | 2 × 10$^{13}$ | o | o | 360 | Comp. Ex. |
| 3-4 | 10 | 2 × 10$^9$ | o | o | 400 | Example |
| 3-5 | 1500 | 2 × 10$^9$ | o | o | 410 | Example |
| 3-6 | 10 | 2 × 10$^{12}$ | o | o | 380 | Example |
| 3-7 | 1500 | 2 × 10$^{12}$ | o | o | 390 | Example |

Since Experiments 3-1 and 3-4 to 3-7 were within the suitable ranges of the film thickness and the elastic modulus, a flat and smooth film surface and sufficient air escapability could be obtained, and it was confirmed that extremely excellent characteristics as a film for decoration could be obtained.

On the other hand, because the elastic modulus of the film was so low in Experiment 3-2 that irregularity occurred on the film surface, bubble escapability could not be obtained. In Experiment 3-3, the film was so hard that its property to follow up a curved surface was low and the film could not be used as a film for decoration.

I claim:

1. An adhesive film for decoration comprising an adhesive coated on a surface of a film substrate, wherein said adhesive has elastic microspheres, wherein said elastic microspheres have an elastic modulus of from 1×10$^4$ to 1×10$^7$ dyn/cm$^2$; a volume average diameter of from 10 to 100 μm;

wherein 30 to 900 parts by weight of said elastic microspheres are added to 100 parts by weight of said adhesive; and wherein a mixture of said adhesive and said elastic microspheres is coated in a coating weight within the range of about 4 to 40 g/m$^2$; wherein upon application of the Escapability of Bubbles Test, air bubbles are completely pushed out from under the adhesive film, and wherein upon application of the Smoothness of Film Surface Test, the shapes of the elastic microspheres are not recognized.

2. An adhesive film substrate according to claim 1, wherein an elastic modulus of said film is 1×10$^9$ to 1×10$^{12}$ dyn/cm$^2$, and a thickness is within the range of 10 μm to 1,500 μm.

3. An adhesive film according to claim 1, wherein said elastic microspheres form clusters.

4. An adhesive film according to claim 3, wherein said elastic microspheres have hollows or voids.

5. An adhesive film according to claim 1, wherein said adhesive is coated to a thickness of 20 to 90% with respect to the volume average diameter of said elastic micro spheres.

* * * * *